US008676524B2

(12) United States Patent
Wu et al.

(10) Patent No.: US 8,676,524 B2
(45) Date of Patent: Mar. 18, 2014

(54) SYSTEM FOR COMPUTING MACHINE PARAMETERS OF AN INDUCTION MACHINE

(75) Inventors: Rong-Ching Wu, Kaohsiung County (TW); Chen-Sen Ouyang, Kaohsiung County (TW); Ching-Tai Chiang, Kaohsiung County (TW)

(73) Assignee: I-Shou University, Kaohsiung (TW)

( * ) Notice: Subject to any disclaimer, the term of this patent is extended or adjusted under 35 U.S.C. 154(b) by 807 days.

(21) Appl. No.: 12/774,945

(22) Filed: May 6, 2010

(65) Prior Publication Data
US 2011/0276301 A1    Nov. 10, 2011

(51) Int. Cl.
*G06F 19/00* (2011.01)

(52) U.S. Cl.
USPC ............................................. 702/60; 318/727

(58) Field of Classification Search
USPC ................. 702/115, 57–60, 85, 90, 106, 183
See application file for complete search history.

(56) References Cited

U.S. PATENT DOCUMENTS

| | | | | |
|---|---|---|---|---|
| 5,388,052 | A * | 2/1995 | Mann .............................. | 702/65 |
| 5,861,728 | A * | 1/1999 | Tazawa et al. ................. | 318/778 |
| 6,163,137 | A * | 12/2000 | Wallace et al. ................. | 322/20 |
| 6,388,419 | B1 * | 5/2002 | Chen et al. ..................... | 318/727 |
| 6,862,538 | B2 * | 3/2005 | El-Ibiary ......................... | 702/38 |
| 8,140,291 | B2 * | 3/2012 | Kasztenny et al. ........... | 702/115 |
| 2002/0093266 | A1 * | 7/2002 | Buening et al. ................ | 310/198 |
| 2007/0118308 | A1 * | 5/2007 | El-Ibiary ......................... | 702/60 |
| 2009/0008938 | A1 * | 1/2009 | Erdman et al. .................. | 290/44 |

OTHER PUBLICATIONS

"Fast Analysis for Power Parameters by the Newton Method," 2009 IEEE/ASME International Conference on Advanced Intelligent Mechatronics, pp. 1868-1872, Jul. 2009.

* cited by examiner

*Primary Examiner* — Sujoy Kundu
*Assistant Examiner* — Corey Bailey
(74) *Attorney, Agent, or Firm* — Alan Kamrath; Kamrath IP Lawfirm, P.A.

(57) ABSTRACT

A system for computing machine parameters of an induction machine includes a relation providing module and a circuit parameter computing module. The relation providing module is operable to provide a relationship between slip rates and primary side resistances of the induction machine and a relationship between the slip rates and primary side reactances of the induction machine. The circuit parameter computing module is operable to perform a parameter computing process according to the relationships obtained from the relation providing module. The parameter computing process includes the steps of: a) generating a set of initial values of equivalent circuit parameters of the induction machine; b) updating the initial values; c) calculating a cumulative resistance error and a cumulative reactance error; and d) repeating steps b) and c) until the cumulative resistance error and the cumulative reactance error are smaller than first and second error thresholds, respectively.

20 Claims, 8 Drawing Sheets

SYSTEM FOR COMPUTING MACHINE PARAMETERS OF AN INDUCTION MACHINE

BACKGROUND OF THE INVENTION

1. Field of the Invention

The present invention relates to a system for computing machine parameters, more particularly to a system for computing machine parameters of an induction machine.

2. Description of the Related Art

Nowadays, induction machines are relatively popular and are commonly applied to generators used in the industry due to simplicity and easy of operation thereof. It is important to establish an equivalent model (such as a transient model, or a steady-state model) of an induction machine for predicting performance and designing control schemes. Techniques for acquiring relevant parameters of the equivalent model of the induction machine can be generally classified into online and offline identification systems. In offline identification, the relevant parameters of the equivalent model can be found by standard tests, such as a locked rotor test, a no-load test, and a stand-still frequency response test.

In online identification, a spectrum method is used for estimating the relevant parameters of the equivalent model via features of the induction machine. A model reference adaptive system utilizes an error between estimated and reference measurements to calculate the relevant parameters. An artificial intelligence method utilizes an artificial neural network model instead of the model used in the model reference adaptive system.

The above-mentioned methods have respective advantages. However, all the methods have a general disadvantage in that all the relevant parameters can be acquired only after a rotor speed of the induction machine reaches a steady state. For example, regarding the model reference adaptive system, while circuit parameters can be obtained in an activation stage of the induction machine, mechanical parameters can be obtained only after a predetermined duration when the induction machine is in the steady state.

SUMMARY OF THE INVENTION

Therefore, an object of the present invention is to provide a system for computing machine parameters of an induction machine that can overcome the above drawbacks of the prior art.

Accordingly, a system of the present invention is adapted for computing machine parameters of an induction machine. The system comprises a relation providing module and a circuit parameter computing module coupled to the relation providing module.

The relation providing module is operable to provide a relationship between slip rates and primary side resistances of the induction machine and a relationship between the slip rates and primary side reactances of the induction machine. The circuit parameter computing module is operable to perform a parameter computing process that includes the steps of:

a) generating a set of initial values of equivalent circuit parameters of the induction machine according to the primary side resistances and the primary side reactances corresponding to a set of predetermined slip rate values based on the relationship between the slip rates and the primary side resistances and the relationship between the slip rates and the primary side reactances obtained from the relation providing module;

b) updating the set of initial values of the equivalent circuit parameters using correcting parameters that are obtained based upon a resistance error and a reactance error of the set of initial values of the equivalent circuit parameters with respect to the primary side resistance and the primary side reactance corresponding to each of the slip rates as obtained from the relation providing module;

c) calculating a cumulative resistance error and cumulative reactance error of the set of initial values of the equivalent circuit parameters updated in step b) with respect to the primary side resistance and the primary side reactance corresponding to each of the slip rates as obtained from the relation providing module; and d) repeating steps b) and c) until the cumulative resistance error and the cumulative reactance error are smaller than first and second error thresholds, respectively.

The circuit parameter computing module outputs the set of initial values of the equivalent circuit parameters as estimated circuit parameters of the induction machine when the cumulative resistance error and the cumulative reactance error are smaller than the first and second error thresholds, respectively.

Preferably, the relation providing module includes a signal acquisition module and an impedance computing module coupled to the signal acquisition module. The signal acquisition module is adapted for acquiring voltage, current and rotor speed signals of the induction machine at different time points of an activation stage of the induction machine. The impedance computing module is operable to obtain the primary side resistances, the primary side reactances, and the slip rates of the induction machine for the respective time points of the activation stage of the induction machine according to the voltage, current and rotor speed signals from the signal acquisition module, and to define the relationship between the slip rates and the primary side resistances and the relationship between the slip rates and the primary side reactances.

Preferably, the system of the present invention further comprises a torque computing module coupled to the signal acquisition module and the circuit parameter computing module, and a mechanical parameter computing module coupled to the signal acquisition module and the torque computing module. The torque computing module is operable to generate a set of output torques of the induction machine according to the estimated circuit parameters from the circuit parameter computing module, and the voltage and rotor speed signals from the signal acquisition module. The mechanical parameter computing module is operable to generate a set of mechanical parameters of the induction machine according to the output torques from the torque computing module and the rotor speed signal from the signal acquisition module.

BRIEF DESCRIPTION OF THE DRAWINGS

Other features and advantages of the present invention will become apparent in the following detailed description of the preferred embodiment with reference to the accompanying drawings, of which.

DETAILED DESCRIPTION OF THE PREFERRED EMBODIMENT

Figure 1:
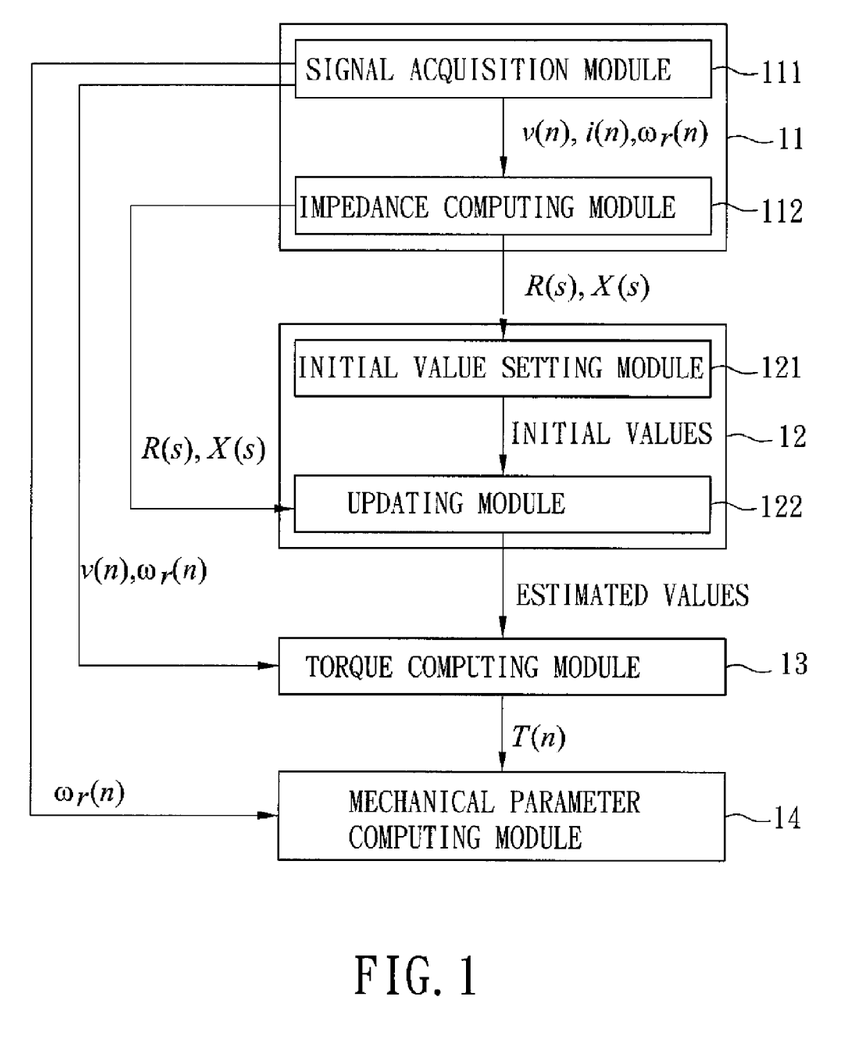
FIG. 1 is a block diagram of a preferred embodiment of a system for computing machine parameters of an induction machine according to the present invention.

Referring to FIG. 1, the preferred embodiment of a system for computing machine parameters of an induction machine according to this invention includes a relation providing module 11, a circuit parameter computing module 12, a torque computing module 13, and a mechanical parameter computing module 14.

The relation providing module 11 includes a signal acquisition module 111 and an impedance computing module 112 coupled to the signal acquisition module 111. The signal acquisition module 111 is adapted for acquiring a voltage signal $v(n)$, a current signal $i(n)$, and a rotor speed signal $\omega_r(n)$ of the induction machine at different time points n of an activation stage of the induction machine (i.e., rotor speed of the induction is increased from a static state to a no-load state).

The impedance computing module 112 is operable according to "Fast Analysis for Power Parameters by the Newton Method," 2009 *IEEE/ASME International Conference on Advanced Intelligent Mechatronics*, pages 1868-1872, July 2009. First, the impedance computing module 112 is operable to obtain primary side resistances $R(n)$, primary side reactances $X(n)$, and slip rates $s(n)$ of the induction machine for the respective time points n of the activation stage of the induction machine according to the voltage, current and rotor speed signals $v(n)$, $i(n)$ and $\omega_r(n)$ from the signal acquisition module 111. From the static state to the no-load state, a number N of an arithmetic progression set of slip rates $s(n)$ can be computed using interpolation based upon the following Equation (1), $$s(n) = \frac{\omega_s - \omega_r(n)}{\omega_s}, n = 0, 1, 2, \ldots, N-1 \tag{1}$$

where $\omega_s$ is a synchronous speed of the induction machine. When the induction machine is in a static state, the rotor speed $\omega_r(n)$ is 0, and thus, the corresponding slip rate $s(n)$ is 1. When the induction machine reaches the synchronous speed $\omega_s$, the corresponding slip rate $s(n)$ is 0.

Moreover, the voltage signal $v(n)$ and the current signal $i(n)$ can be expressed as $$v(n) = A_v(n)\cos\left(\frac{2\pi f(n)n}{R} + \phi_v(n)\right) \tag{2}$$

-continued $$i(n) = A_i(n)\cos\left(\frac{2\pi f(n)n}{R} + \phi_i(n)\right), \tag{3}$$

where $A_v(n)$ is an amplitude parameter of the voltage signal $v(n)$, $A_i(n)$ is an amplitude parameter of the current signal $i(n)$, R is a sampling rate, $f(n)$ is a frequency parameter, $\phi_v(n)$ is a phase parameter of the voltage signal $v(n)$, and $\phi_i(n)$ is a phase parameter of the current signal $i(n)$.

The impedance computing module 112 is operable to obtain primary side voltage values and primary side current values with respect to the different time points n of the activation stage of the induction machine according to Equations (2) and (3). Then, according to the following Equations (4) and (5), the impedance computing module 112 is operable to obtain the primary side resistances $R(n)$ and the primary side reactances $X(n)$ with respect to the different time points n of the activation stage based upon the primary side voltage values divided by the primary side current values, respectively.

$$R(n) = \frac{A_v(n)}{A_i(n)}\cos(\phi_v(n) - \phi_i(n)) \tag{4}$$

$$X(n) = \frac{A_v(n)}{A_i(n)}\sin(\phi_v(n) - \phi_i(n)) \tag{5}$$

Each of the time points n of the activation stage corresponds to one of the primary side resistances $R(n)$, one of the primary side reactances $X(n)$, and one of the slip rates $s(n)$. Thus, the impedance computing module 112 is further operable to define the relationship between the slip rates $s(n)$ and the primary side resistances $R(n)$, and the relationship between the slip rates $s(n)$ and the primary side reactances $X(n)$. In practice, the above-mentioned relationship can be established as a look-up table stored in the impedance computing module 112 or other storage media.

Figure 2:
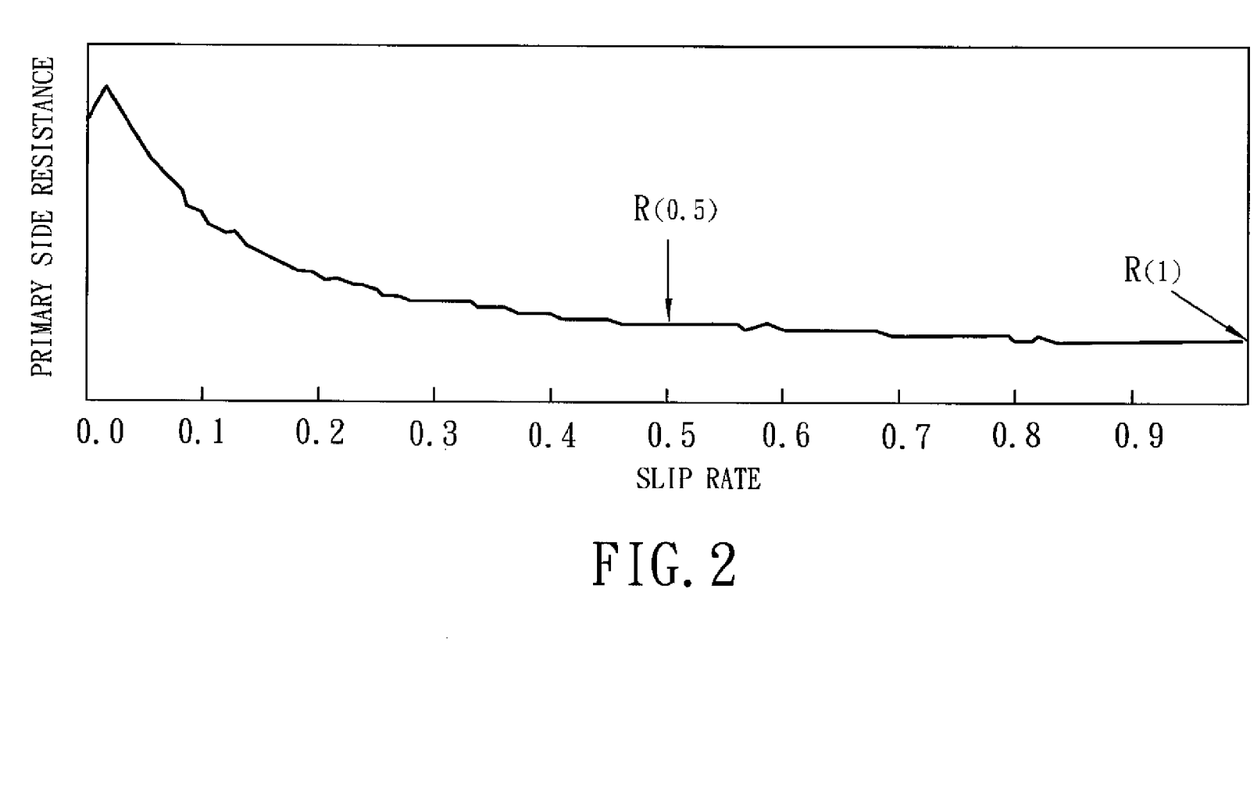
FIG. 2 is a plot of primary side resistances of an induction machine versus slip rates.
Figure 3:
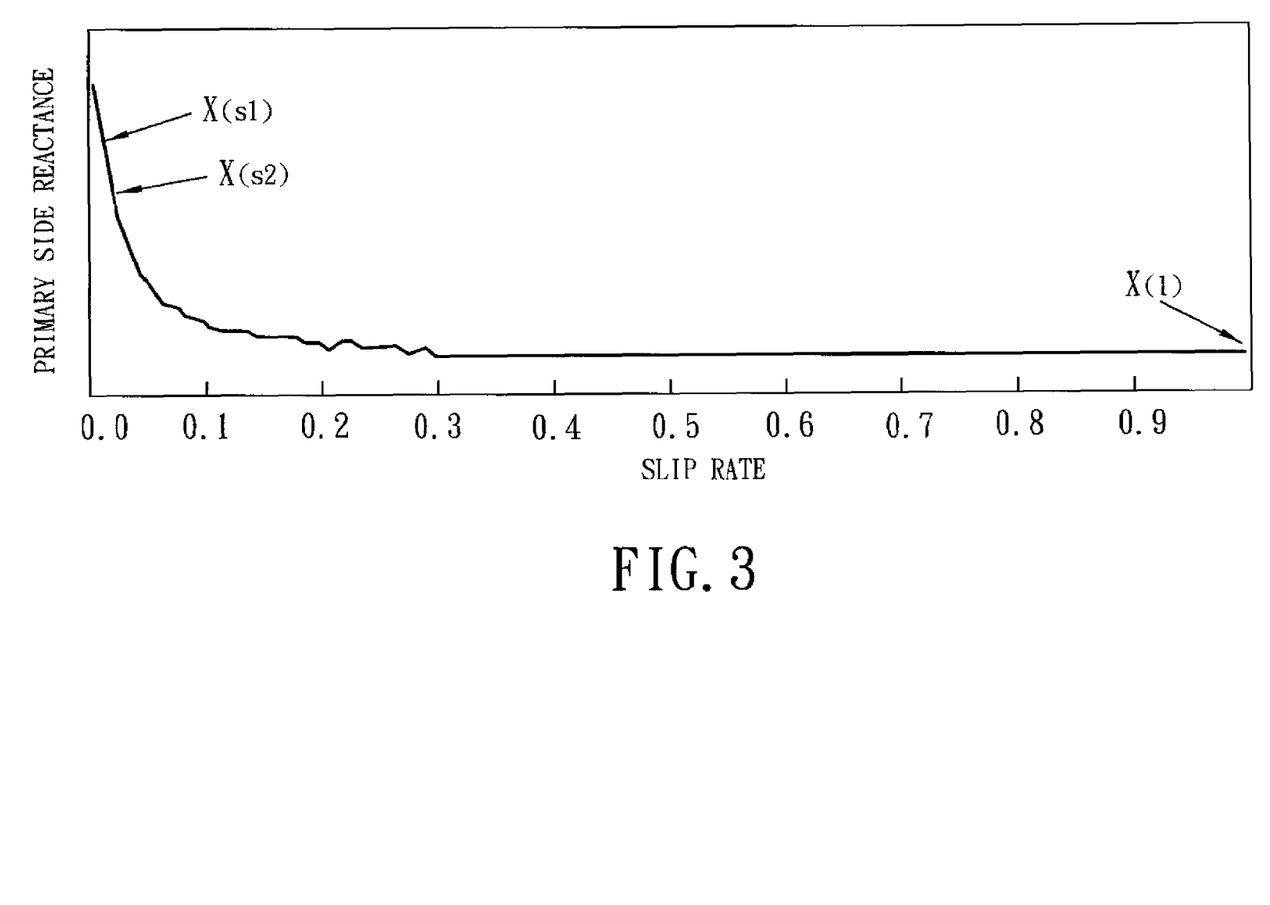
FIG. 3 is a plot of primary side reactances of an induction machine versus slip rates.

FIG. 2 illustrates a plot of the primary side resistance $R(s)$ versus the slip rates $s(n)$, and FIG. 3 illustrates a plot of the primary side reactances $X(s)$ versus the slip rates $s(n)$. It can be appreciated from FIG. 2 that the primary side resistance $R(s)$ increases linearly within a primary stage of starting of the induction machine (i.e., the slip rate $s(n)$ is equal to 1), and has a maximum value when the rotor speed $\omega_r(n)$ of the induction machine is close to the synchronous speed $\omega_s$ (i.e., the slip rate $s(n)$ is approximately 0). Further, it can be appreciated from FIG. 3 that the primary side reactance $X(s)$ is smooth within the primary stage of starting of the induction machine.

Figure 4:
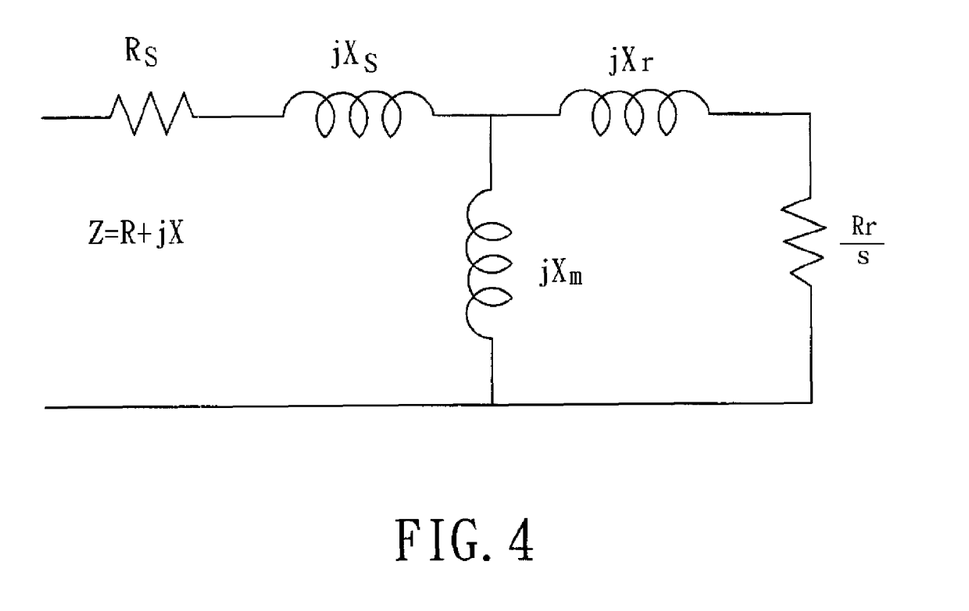
FIG. 4 is a circuit diagram illustrating an equivalent circuit of the induction machine.

When energy storage capacity of inductance components of the induction machine is significantly small, an equivalent circuit of the induction machine may be that shown in FIG. 4. Equivalent circuit parameters of the equivalent circuit shown in FIG. 4 include a stator resistance $R_s$, a rotor resistance $R_r$, a stator reactance $X_s$, a rotor reactance $X_r$, and a magnetizing reactance $X_m$. According to the circuit parameters of the equivalent circuit shown in FIG. 4, the primary side resistance $R(s)$ and the primary side reactance $X(s)$ of the induction machine can be expressed as $$R(s) = R_s + \frac{X_m^2 R_r/s}{(R_r/s)^2 + (X_m + X_r)^2}, \text{ and} \tag{6}$$

-continued $$X(s) = X_s + X_m - \frac{X_m^2(X_m + X_r)}{(R_r/s)^2 + (X_m + X_r)^2}. \quad (7)$$

From Equations (6) and (7), it can be appreciated that only $R_r/s$ is affected by the slip rate s(n), and both the primary side resistance R(s) and the primary side reactance X(s) vary with time.

Figure 5:
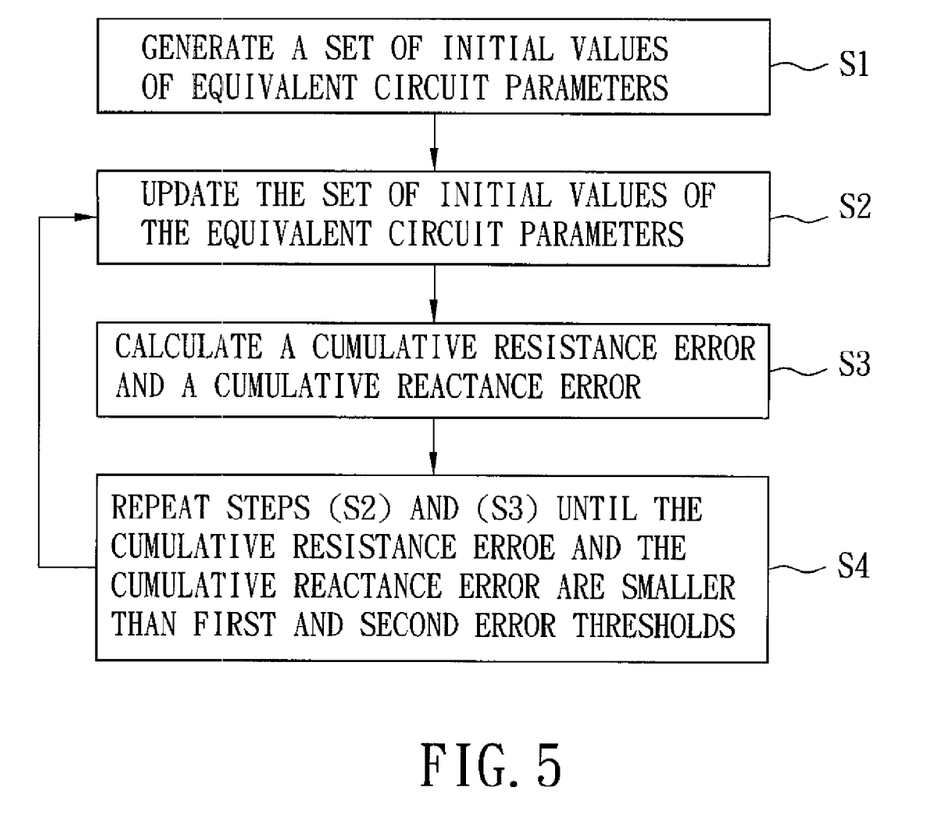
FIG. 5 is a flow chart illustrating a parameter computing process performed by a circuit parameter computing module of the system of the preferred embodiment.

Referring to FIGS. 1 and 5, the circuit parameter computing module 12 includes an initial value setting module 121 coupled to the impedance computing module 112, and an updating module 122 coupled to the impedance computing module 112 and the initial value setting module 121. The circuit parameter computing module 12 is operable to perform a parameter computing process that includes the following steps.

In step (S1), the initial value setting module 121 is operable to generate a set of initial values of the equivalent circuit parameters $R_s$, $R_r$, $X_s$, $X_r$ and $X_m$ of the induction machine.

Within the primary stage of starting of the induction machine (the slip rate is between 0.5 and 1), the primary side resistance R(s) has a linear relationship with the slip rate s(n) due to $X_m \gg X_s$ and $R_r$. Thus, Equation (6) can be simplified as $$R(s) \approx R_s + R_r/s, \, 0.5 < s < 1. \quad (8)$$

For generating the set of initial values of the equivalent circuit parameters $R_s$, $R_r$, $X_s$, $X_r$ and $X_m$, the initial value setting module 121 is operable to find, from the look-up table stored in the impedance computing module 112, the primary side resistance R(1) corresponding to the slip rate of 1, the primary side reactance X(1) corresponding to the slip rate of 1, the primary side resistance R(0.5) corresponding to the slip rate of 0.5, and two primary side reactances $X(s_1)$ and $X(s_2)$ corresponding to the slip rates $s_1$ and $s_2$ that are approximately 0. According to Equation (8), the initial value $R_r^0$ of the rotor resistance $R_r$, and the initial value $R_s^0$ of the stator resistance $R_s$ can be obtained based upon $$R_r^0 = 0.5(R(0.5) - R(1)), \text{ and} \quad (9)$$

$$R_s^0 = R(1) - R_r^0. \quad (10)$$

During the primary stage of starting of the induction machine, variance of the primary side reactance X(s) is significantly small and can be approximated as the sum of the stator reactance $X_s$ and the rotor reactance $X_r$. In this embodiment, the initial value setting module 121 is operable to set the initial value $X_s^0$ of the stator reactance $X_s$ and the initial value $X_r^0$ of the rotor reactance $X_r$ as $$X_s^0 = X_r^0 = 0.5X(1). \quad (11)$$

When the rotor speed $\omega_r(n)$ of the induction machine is approximately the synchronous speed $\omega_s$, the primary side reactance X(s) increases linearly. In practice, the rotor speed $\omega_r(n)$ of the induction machine usually cannot reach the synchronous speed $\omega_s$. Therefore, by using an extrapolation method, the initial value $X_m^0$ of the magnetizing reactance $X_m$ can be obtained based upon the following Equation (12).

$$X_m^0 = X(s_1) + \frac{s_1}{s_2 - s_1}(X(s_1) - X(s_2)) - X_s^0 \quad (12)$$

According to Equations (9) to (12), the set of initial values $R_r^0$, $R_s^0$, $X_s^0$, $X_s^0$ and $X_m^0$ of the equivalent circuit parameters $R_s$, $R_r$, $X_s$, $X_r$ and $X_m$ can be obtained using the initial value setting module 121. It should be noted that suitable initial values could promote efficiency of operation of the updating module 122 in the following steps.

In step (S2), the updating module 122 is operable to update the set of initial values $R_r^0$, $R_s^0$, $X_s^0$, $X_r^0$ and $X_m^0$ of the equivalent circuit parameters $R_s$, $R_r$, $X_s$, $X_r$ and $X_m$ of the induction machine.

The resistance error corresponding to the primary side resistances R(s) with respect to the slip rates s(n) can be expressed as the following Equation (13), while the reactance error corresponding to the primary side reactances X(s) with respect to the slip rates s(n) can be expressed as the following Equation (14).

$$e_R(s) = R(s) - R_s - \frac{X_m^2 R_r/s}{M^2} \quad (13)$$

$$e_X(s) = X(s) - X_s - X_m + \frac{X_m^2(X_m + X_r)}{M^2} \quad (14)$$

In Equations (13) and (14), the primary side resistances R(s) and the primary side reactances X(s) can be obtained from the impedance computing module 112, and M is an auxiliary equation, i.e., $$M^2 = (R_r/s)^2 + (X_m + X_r)^2. \quad (15)$$

During acceleration of the rotor speed $\omega_r(n)$ of the induction machine toward the synchronous speed $\omega_s$, a cumulative resistance error function corresponding to the primary side resistances R(s) and a cumulative reactance error function corresponding to the primary side reactances X(s) can be expressed as $$ER = \sum_{n=0}^{N-1}\left(R(s(n)) - R_s - \frac{X_m^2 R_r/s(n)}{(R_r/s(n))^2 + (X_m + X_r)^2}\right)^2, \quad (16)$$

and $$EX = \sum_{n=0}^{N-1}\left(X(s(n)) - X_s - X_m + \frac{X_m^2(X_m + X_r)}{(R_r/s(n))^2 + (X_m + X_r)^2}\right)^2. \quad (17)$$

The relation between the time points n and the slip rates s(n) can be found in Equation (1).

The cumulative resistance error function ER and the cumulative reactance error function EX are functions having extreme values. At the extreme value, the gradient of the each of the cumulative resistance error function ER and the cumulative reactance error function EX for each of the equivalent circuit parameters $R_s$, $R_r$, $X_s$, $X_r$ and $X_m$ is 0. Nonzero gradients can be obtained near the extreme value, and thus, optimal solution of the equivalent circuit parameters $R_s$, $R_r$, $X_s$, $X_r$ and $X_m$ can be found with reference to the nonzero gradients.

Accordingly, for each of the equivalent circuit parameters $R_s$, $R_r$, $X_s$, $X_r$ and $X_m$, the updating module 122 is operable to calculate a partial differential value as a correcting parameter for updating the set of initial values in step (S2). The partial differential value for each of the equivalent circuit parameters $R_s$, $R_r$, $X_s$, $X_r$ and $X_m$ can be obtained based upon the following Equations (18) to (22).

$$\frac{\partial E_X}{\partial X_s} = -2\sum_{n=0}^{N-1} e_X(s(n)) \quad (18)$$

$$\frac{\partial E_X}{\partial X_r} = -2\sum_{n=0}^{N-1} e_X(s(n))\frac{\partial X}{\partial X_r} \quad (19)$$

$$\frac{\partial E_X}{\partial X_m} = -2\sum_{n=0}^{N-1} e_X(s(n))\frac{\partial X}{\partial X_m} \quad (20)$$

$$\frac{\partial E_R}{\partial R_s} = -2\sum_{n=0}^{N-1} e_R(s(n)) \quad (21)$$

$$\frac{\partial E_R}{\partial R_r} = -2\sum_{n=0}^{N-1} e_R(s(n))\left(\frac{\partial X}{\partial X_r}\frac{1}{s(n)}\right) \quad (22)$$

In Equations (18) to (22), $e_R(s(n))$ and $e_X(s(n))$ can be obtained based upon Equations (13) and (14), and $$\frac{\partial X}{\partial X_r} = \frac{X_m^2((R_r/s)^2 + (X_m + X_r)^2)}{M^2} \quad (23)$$

$$\frac{\partial X}{\partial X_m} = 1 - \frac{2X_m(X_m + X_r)}{M^2} + \frac{\partial X}{\partial X_r}. \quad (24)$$

Then, the updating module 122 is operable to update the set of initial values $R_r^0$, $R_s^0$, $X_s^0$, $X_r^0$ and $X_m^0$ of the equivalent circuit parameters $R_s$, $R_r$, $X_s$, $X_r$ and $X_m$ according to $$R_s^{v+1} = R_s^v - \eta_{R_s}\left(\frac{\partial E_R}{\partial R_s}\right) \quad (25)$$

$$R_r^{v+1} = R_r^v - \eta_{R_r}\left(\frac{\partial E_R}{\partial R_r}\right) \quad (26)$$

$$X_s^{v+1} = X_s^v - \eta_{X_s}\left(\frac{\partial E_X}{\partial X_s}\right) \quad (27)$$

$$X_r^{v+1} = X_r^v - \eta_{X_r}\left(\frac{\partial E_X}{\partial X_r}\right) \quad (28)$$

$$X_m^{v+1} = X_m^v - \eta_{X_m}\left(\frac{\partial E_X}{\partial X_m}\right) \quad (29)$$

where v is an integer indicating times of updating, and $\eta_{R_s}$, $\eta_{R_r}$, $\eta_{X_s}$, $\eta_{X_r}$ and $\eta_{X_m}$ are known as acceleration factors corresponding to the stator resistance $R_s$, the rotor resistance $R_r$, the stator reactance $X_s$, the rotor reactance $X_r$, and the magnetizing reactance $X_m$, respectively.

In step (S3), the updating module 122 is further operable to calculate a cumulative resistance error $E_R$ and a cumulative reactance error $E_X$ with respect to the set of the values $R_s^{\theta+1}$, $R_r^{\theta+1}$, $X_s^{\theta+1}$, $X_r^{\theta+1}$ and $X_m^{\theta+1}$ updated in step (S2) based upon Equations (16) and (17).

In step (S4), the updating module 122 is operable to repeat steps (S2) and (S3) until the cumulative resistance error $E_R$ and the cumulative reactance error $E_X$ are smaller than first and second error thresholds, respectively. The updating module 122 outputs the values $R_s^{\theta+1}$, $R_r^{\theta+1}$, $X_s^{\theta+1}$, $X_r^{\theta+1}$ and $X_m^{\theta+1}$ obtained in step (S2) as estimated circuit parameters of the induction machine when the cumulative resistance error $E_R$ and the cumulative reactance error $E_X$ are smaller than the first and second error thresholds, respectively. Therefore, the estimated circuit parameters are the optimal solution of the equivalent circuit parameters $R_s$, $R_r$, $X_s$, $X_r$ and $X_m$, of the equivalent circuit of the induction machine.

Referring again to FIG. 1, the torque computing module 13 is coupled to the signal acquisition module 111 and the updating module 122. The torque computing module 13 is operable to transform the voltage signal v(n) with respect to an a-b-c coordinate from the signal acquisition module 111 to a pair of stator voltage signals $v_{qs}(n)$ and $v_{ds}(n)$ with respect to a q-d-0 coordinate based upon the following Equations (30) and (31), respectively. Moreover, the torque computing module 13 is operable to set a pair of rotor voltage signals as $v_{qs}(n)=0$ and $v_{ds}(n)=0$.

$$v_{qs}(n) = A_v(n)\cos\left(\frac{2\pi f(n)n}{R} + \phi_v(n)\right) \quad (30)$$

$$v_{ds}(n) = -A_v(n)\sin\left(\frac{2\pi f(n)n}{R} + \phi_v(n)\right) \quad (31)$$

A dynamic model of the induction machine can be described as $$v_{qs}=(R_s+L_sp)i_{qs}+L_mpi_{qr} \quad (32)$$

$$v_{ds}=(R_s+L_sp)i_{ds}+L_mpi_{dr} \quad (33)$$

$$v_{qr}=L_mpi_{qs}-\omega_rL_mi_{ds}+(R_r+L_rp)i_{qr}-\omega_rL_ri_{dr} \quad (34)$$

$$v_{dr}=\omega_rL_mpi_{qs}+L_mpi_{ds}+\omega_rL_ri_{qr}+(R_r+L_rp)i_{dr} \quad (35)$$

where $i_{qs}$ and $i_{ds}$ are stator currents, $i_{qr}$ and $i_{dr}$ are rotor currents, $L_s$ is a stator inductance, $L_r$ is a rotor inductance, $L_m$ is a magnetizing inductance, and p is a differential factor ($p=\partial/\partial t$). The stator inductance $L_s$, the rotor inductance $L_r$ and the magnetizing inductance $L_m$ can be obtained based upon $$L_s=X_s/\omega_s, \quad (36)$$

$$L_r=X_r/\omega_s, \text{and} \quad (37)$$

$$L_m=X_m/\omega_s. \quad (38)$$

Since the stator voltage signals $v_{qs}(n)$ and $v_{ds}(n)$, the rotor voltage signals $v_{qs}(n)$ and $v_{ds}(n)$, and the stator inductance $L_s$, the rotor inductance $L_r$ and the magnetizing inductance $L_m$ are known, the stator currents $i_{qs}$ and $i_{ds}$, and the rotor currents $i_{qr}$ and $i_{dr}$ can be obtained based upon the dynamic model of the induction machine described in Equations (32) to (35). Then, the torque computing module 13 is operable to generate a set of output torques T of the induction machine based upon $$T=3PL_m(i_{dr}i_{qs}-i_{qr}i_{ds}) \quad (39)$$

where P is a number of poles.

The mechanical parameter computing module 14 is coupled to the signal acquisition module 111 and the torque computing module 13. The mechanical parameter computing module 14 is operable to generate a set of mechanical parameters of the induction machine that include a moment of inertia J and a friction coefficient B.

In this embodiment, it is assumed that the output torque T of the induction machine only affects the rotor speed $\omega_r(n)$ but not other mechanical load. Thus, the rotor speed $\omega_r(n)$ of the induction machine satisfies the following electromechanical dynamic equation, $$J\dot{\omega}_r+B\omega_r=T. \quad (40)$$

A discrete form of Equation (40) can be expressed as $$J(\omega_r(n)-\omega_r(n-1))+B\omega_r(n)=T(n), n=0, 1, 2, \ldots, N-1 \quad (41)$$

Assuming that the induction machine is linear, the moment of inertia J and the friction coefficient B are constant, and a cumulative torque error can be expressed as $$E_T = \sum_{n=0}^{N-1} [T(n) - J(\omega_r(n) - \omega_r(n-1)) - B\omega_r(n)]^2. \quad (42)$$

Since the cumulative torque error has a minimum value and is expressed as a linear differential equation, the moment of inertia J and the friction coefficient B can be obtained based upon $$\begin{bmatrix} J \\ B \end{bmatrix} = \quad (43)$$

$$\begin{bmatrix} \sum_{n=0}^{N-1} (\omega_r(n) - \omega_r(n-1))^2 & \sum_{n=0}^{N-1} \omega_r(n)(\omega_r(n) - \omega_r(n-1)) \\ \sum_{n=0}^{N-1} \omega_r(n)(\omega_r(n) - \omega_r(n-1)) & \sum_{n=0}^{N-1} (\omega_r(n))^2 \end{bmatrix}^{-1}$$

$$\begin{bmatrix} \sum_{n=0}^{N-1} T(n)(\omega_r(n) - \omega_r(n-1)) \\ \sum_{n=0}^{N-1} T(n)\omega_r(n) \end{bmatrix},$$

where T(n) is the output torque corresponding to the time point n, and $\omega_r(n)$ is the rotor speed corresponding to the time point n.

It should be noted that the components of the system of the present invention can not only be embodied in hardware, but also as a computer program product or firmware.

The following description is provided to illustrate an estimation result of a three-phase, 4-pole, ½ Hp and 60 Hz induction machine using the system of this embodiment.

Referring to Table 1, the cumulative resistance error $E_R$ and the cumulative reactance error $E_X$ become smaller with each iteration. It can be seen that the set of initial values of the equivalent circuit parameters generated by the initial value setting module 121 in step (S1) are approximate to actual values of the equivalent circuit parameters. Therefore, the efficiency of operation of the updating module 122 in steps (S2) to (S4) of the parameter computing process can be enhanced. In Table 1, after 4000 repetitions, the cumulative resistance error $E_R$ and the cumulative reactance error $E_X$ are approximately 0. Due to noise and non-linear factors during operation of the induction machine, it is impossible to make the cumulative resistance error $E_R$ and the cumulative reactance error $E_X$ be 0.

TABLE 1

| Parameter | Initial values | Parameter computing process | | |
|---|---|---|---|---|
| | | $1^{st}$ | $2^{nd}$ | $4000^{th}$ |
| $R_s$ | 23.37 | 23.37 | 23.37 | 24.07 |
| $R_r$ | 8.68 | 8.68 | 8.67 | 8.58 |
| $X_s$ | 13.52 | 13.54 | 13.57 | 18.73 |
| $X_r$ | 13.52 | 13.55 | 13.58 | 13.04 |
| $X_m$ | 335.52 | 335.40 | 335.27 | 248.62 |
| $E_R$ | $8.0 \times 10^{-3}$ | $8.0 \times 10^{-3}$ | $7.9 \times 10^{-3}$ | $2.9 \times 10^{-3}$ |
| $E_X$ | $22.9 \times 10^{-3}$ | $22.7 \times 10^{-3}$ | $22.5 \times 10^{-3}$ | $5.9 \times 10^{-3}$ |

Figure 6:
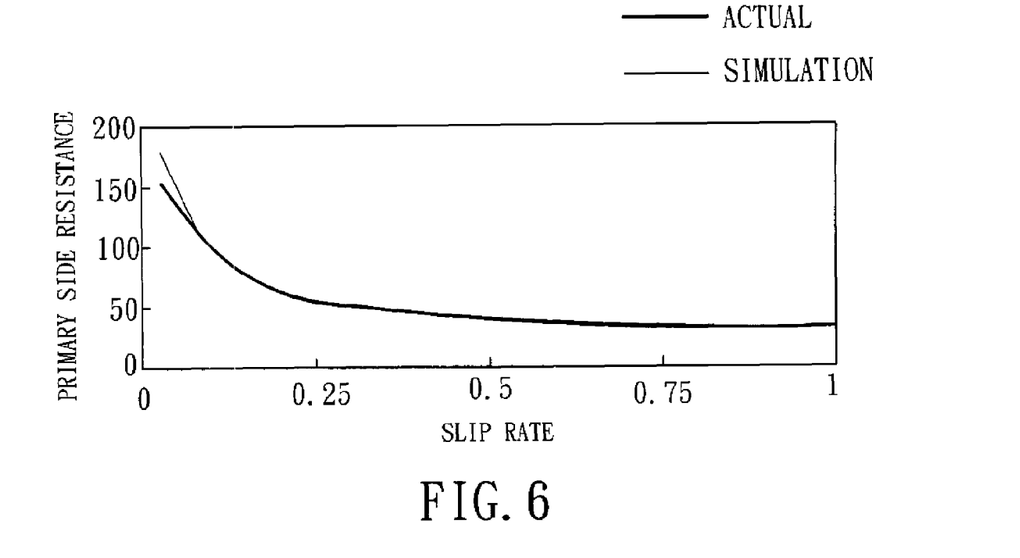
FIG. 6 is a plot to illustrate a comparison between actual primary side resistances of the induction machine and primary side resistances obtained through simulation.
Figure 7:
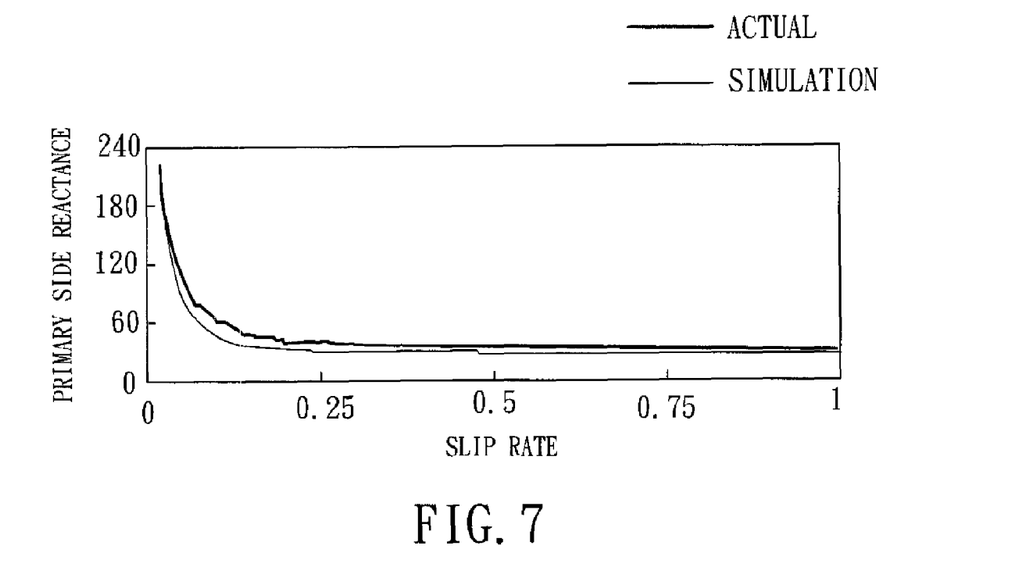
FIG. 7 is a plot to illustrate a comparison between actual primary side reactances of the induction machine and primary side reactances obtained through simulation.
Figure 8:
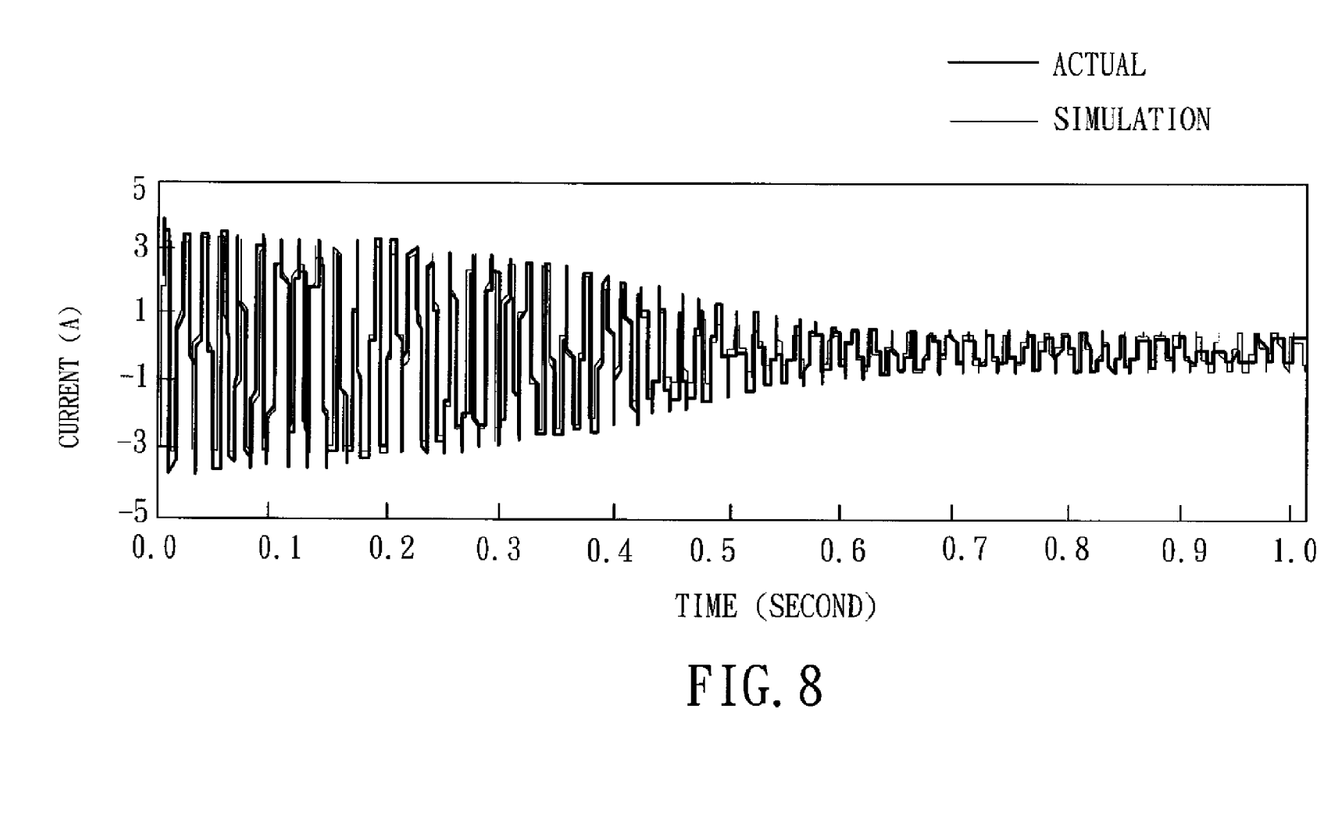
FIG. 8 is a plot to illustrate a comparison between actual currents of the induction machine and currents obtained through simulation.
Figure 9:
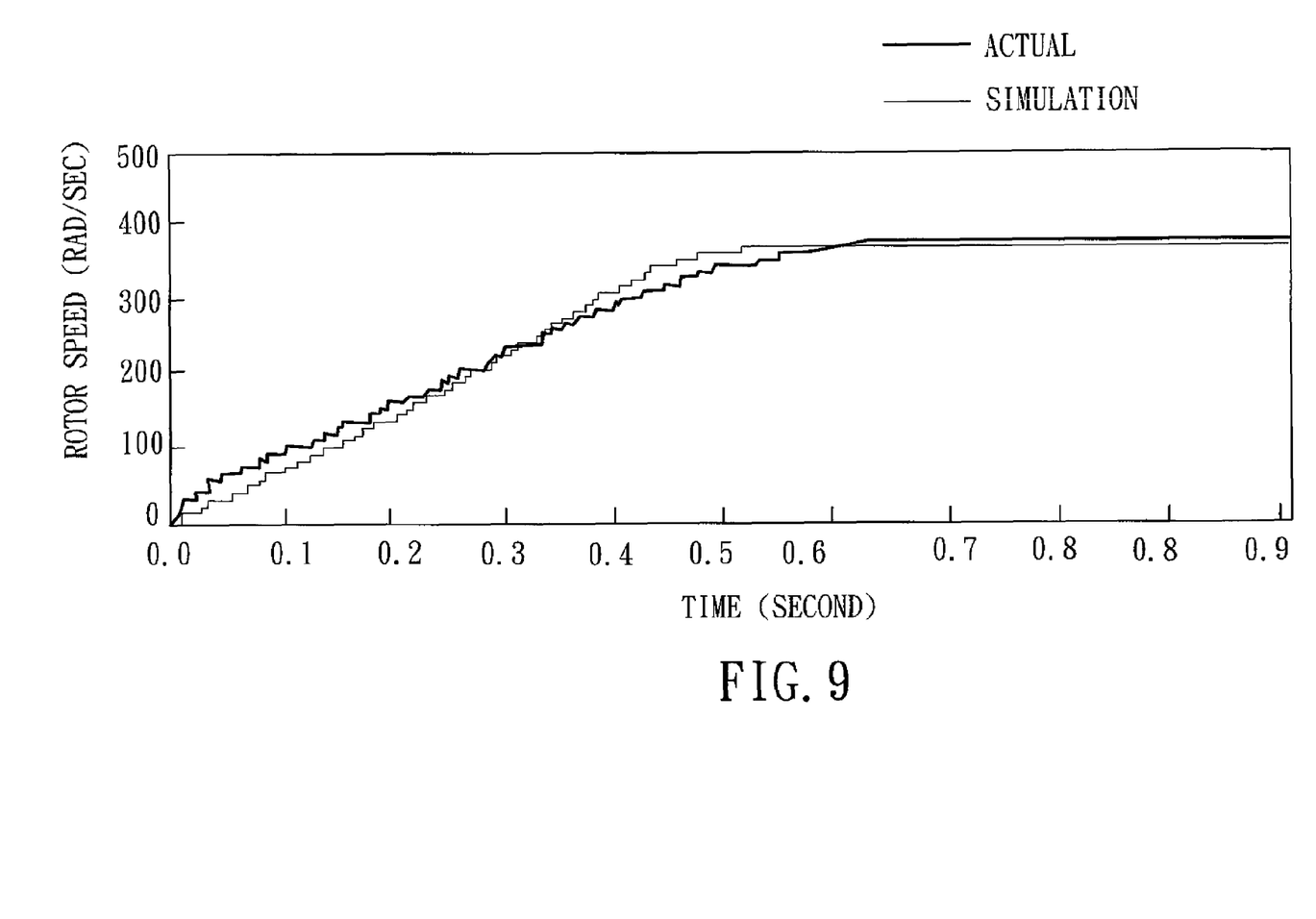
FIG. 9 is a plot to illustrate a comparison between actual rotor speeds of the induction machine and rotor speeds obtained through simulation.

Referring to FIGS. 6 and 7, primary side resistances and primary side reactances computed according to the estimated circuit parameters $R_s$, $R_r$, $X_s$, $X_r$ and $X_m$ are considerably approximate to the actual primary side resistances and actual primary side reactances. Referring to FIGS. 8 and 9, using the estimated circuit parameters $R_s$, $R_r$, $X_s$, $X_r$ and $X_m$ to simulate dynamic behavior of the induction machine, currents and rotor speeds obtained through simulation are considerably similar to actual currents and rotor speeds of the induction machine. Further, the currents of the induction machine gradually converge to a steady state.

In conclusion, within the activation stage of the induction machine, the system of the present invention is operable to estimate the equivalent circuit parameters, the output torques and the mechanical parameters. Further, each of the cumulative resistance error function ER and the cumulative reactance error function EX is a least square difference function, and the initial values of the equivalent circuit parameters $R_s$, $R_r$, $X_s$, $X_r$ and $X_m$ are set suitably. Therefore, it can be ensured that the cumulative resistance error function ER and the cumulative reactance error function EX converge to the first and second error thresholds, and the estimated circuit parameters of the induction machine can be efficiently and accurately obtained.

While the present invention has been described in connection with what is considered the most practical and preferred embodiment, it is understood that this invention is not limited to the disclosed embodiment but is intended to cover various arrangements included within the spirit and scope of the broadest interpretation so as to encompass all such modifications and equivalent arrangements.

What is claimed is:

1. A system for computing machine parameters of an induction machine, comprising:
   a relation providing module operable to provide a relationship between slip rates and primary side resistances of the induction machine and a relationship between the slip rates and primary side reactances of the induction machine wherein each of the slip rates is a ratio of a difference between a synchronous speed of the induction machine and a rotor speed of the induction machine at a corresponding point of time to the synchronous speed; and
   a circuit parameter computing module coupled to said relation providing module and operable to perform a parameter computing process that includes the steps of
   a) generating a set of initial values of equivalent circuit parameters of the induction machine according to the primary side resistances and the primary side reactances corresponding to a set of predetermined slip rate values based on the relationship between the slip rates and the primary side resistances and the relationship between the slip rates and the primary side reactances obtained from said relation providing module,
   b) updating the set of initial values of the equivalent circuit parameters using correcting parameters that are obtained based upon a resistance error and a reactance error of the set of initial values of the equivalent circuit parameters with respect to the primary side resistance and the primary side reactance corresponding to each of the slip rates as obtained from said relation providing module,
   c) calculating a cumulative resistance error and a cumulative reactance error of the set of initial values of the equivalent circuit parameters updated in step b) with respect to the primary side resistance and the primary side reactance corresponding to each of the slip rates as obtained from said relation providing module, and d) repeating steps b) and c) until the cumulative resistance error and the cumulative reactance error are smaller than first and second error thresholds, respectively;

wherein said circuit parameter computing module outputs the set of initial values of the equivalent circuit parameters as estimated circuit parameters of the induction machine when the cumulative resistance error and the cumulative reactance error are smaller than the first and second error thresholds, respectively.

2. The system as claimed in claim 1, wherein, in step a) of the parameter computing process, said circuit parameter computing module is operable to generate the set of initial values of the equivalent circuit parameters of the induction machine according to the primary side resistance corresponding to the slip rate of 1, the primary side reactance corresponding to the slip rate of 1, the primary side resistance corresponding to the slip rate of 0.5, and two primary side reactances corresponding to the slip rates that are approximately 0.

3. The system as claimed in claim 2, wherein the set of initial values of the equivalent circuit parameters generated by said circuit parameter computing module in step a) of the parameter computing process include a stator resistance, a stator reactance, a rotor resistance, a rotor reactance and a magnetizing reactance, and the initial value of the rotor resistance is equal to one-half of a difference between the primary side resistance corresponding to the slip rate of 0.5 and the primary side resistance corresponding to the slip rate of 1.

4. The system as claimed in claim 3, wherein the initial value of the stator resistance is equal to a difference between the initial value of the rotor resistance and the primary side resistance corresponding to the slip rate of 1.

5. The system as claimed in claim 2, wherein the set of initial values of the equivalent circuit parameters generated by said circuit parameter computing module in step a) of the parameter computing process include a stator resistance, a stator reactance, a rotor resistance, a rotor reactance and a magnetizing reactance, and the initial values of the rotor reactance and the stator reactance are both equal to one-half of the primary side resistance corresponding to the slip rate of 1.

6. The system as claimed in claim 5, wherein the initial value of the magnetizing reactance can be expressed as $$X_m^0 = X(s_1) + \frac{s_1}{s_2 - s_1}(X(s_1) - X(s_2)) - X_s^0,$$

where $X_m^0$ is the initial value of the magnetizing reactance, $s_1$ and $s_2$ are the slip rates that are approximately 0, $X(s_1)$ is the primary side reactance corresponding to the slip rate $s_1$, $X(s_2)$ is the primary side reactance corresponding to the slip rate $s_2$, and $X_s^0$ is the initial value of the stator reactance.

7. The system as claimed in claim 1, wherein, in step b) of the parameter computing process, said circuit parameter computing module is operable to calculate a plurality of partial differential values as the correcting parameters for updating the set of initial values of the equivalent circuit parameters, each of the partial differential values being related to a corresponding one of the equivalent circuit parameters, and a corresponding one of a cumulative resistance error function and a cumulative reactance error function, the cumulative resistance error being calculated based upon the cumulative resistance error function, and the cumulative reactance error being calculated based upon the cumulative reactance error function.

8. The system as claimed in claim 7, wherein each of the cumulative resistance error function and the cumulative reactance error function is a least square difference function.

9. The system as claimed in claim 1, wherein said relation providing module includes:

a signal acquisition module for acquiring voltage, current and rotor speed signals of the induction machine at different time points of an activation stage of the induction machine; and an impedance computing module coupled to said signal acquisition module and operable to obtain the primary side resistances, the primary side reactances, and the slip rates of the induction machine for the respective time points of the activation stage of the induction machine according to the voltage, current and rotor speed signals from said signal acquisition module, and to define the relationship between the slip rates and the primary side resistances and the relationship between the slip rates and the primary side reactances.

10. The system as claimed in claim 9, wherein said impedance computing module is operable to obtain the primary side resistances, the primary side reactances, and the slip rates of the induction machine according to a plurality of sets of signal parameters of the voltage, current and rotor speed signals.

11. The system as claimed in claim 10, wherein each of the sets of the signal parameters includes an amplitude parameter of the voltage signal, an amplitude parameter of the current signal, a phase parameter of the voltage signal, a phase parameter of the current signal, and a frequency parameter.

12. The system as claimed in claim 10, wherein said impedance computing module is operable to obtain primary side voltage values and primary side current values with respect to the different time points of the activation stage of the induction machine according to the signal parameters, and to obtain the primary side resistances and the primary side reactances based upon the primary side voltage values divided by the primary side current values, respectively.

13. The system as claimed in claim 9, further comprising a torque computing module coupled to said signal acquisition module and said circuit parameter computing module, wherein said torque computing module is operable to generate a set of output torques of the induction machine according to the estimated circuit parameters from said circuit parameter computing module, and the voltage and rotor speed signals from said signal acquisition module.

14. The system as claimed in claim 13, further comprising a mechanical parameter computing module coupled to said signal acquisition module and said torque computing module, wherein said mechanical parameter computing module is operable to generate a set of mechanical parameters of the induction machine according to the output torques from said torque computing module and the rotor speed signal from said signal acquisition module.

15. The system as claimed in claim 13, wherein said torque computing module is operable to:

obtain a pair of stator currents and a pair of rotor currents according to the estimated circuit parameters, and a pair of stator voltages and a pair of rotor voltages with respect to the voltage signal from said signal acquisition module; and obtain the output torques of the induction machine according to the stator currents and the rotor currents.

16. A method for computing machine parameters of an induction machine, comprising:
   determining, by a computing module, a relationship between slip rates and primary side resistances of the induction machine and a relationship between the slip rates and primary side reactances of the induction machine, wherein each of the slip rates is a ratio of a difference between a synchronous speed of the induction machine and a rotor speed of the induction machine at a corresponding point of time to the synchronous speed; and
   performing, by the computing module, a parameter computing process that includes
      a) generating a set of initial values of equivalent circuit parameters of the induction machine according to the primary side resistances and the primary side reactances corresponding to a set of predetermined slip rate values based on the relationship between the slip rates and the primary side resistances and the relationship between the slip rates and the primary side reactances,
      b) updating the set of initial values of the equivalent circuit parameters using correcting parameters that are obtained based upon a resistance error and a reactance error of the set of initial values of the equivalent circuit parameters with respect to the primary side resistance and the primary side reactance corresponding to each of the slip rates,
      c) calculating a cumulative resistance error and a cumulative reactance error of the set of initial values of the equivalent circuit parameters updated in step b) with respect to the primary side resistance and the primary side reactance corresponding to each of the slip rates, and
      d) repeating steps b) and c) until the cumulative resistance error and the cumulative reactance error are smaller than first and second error thresholds, respectively, and outputting the set of initial values of the equivalent circuit parameters as estimated circuit parameters of the induction machine when the cumulative resistance error and the cumulative reactance error are smaller than the first and second error thresholds, respectively.

17. The method as claimed in claim 16, wherein, step a) of the parameter computing process includes generating the set of initial values of the equivalent circuit parameters of the induction machine according to the primary side resistance corresponding to the slip rate of 1, the primary side reactance corresponding to the slip rate of 1, the primary side resistance corresponding to the slip rate of 0.5, and two primary side reactances corresponding to the slip rates that are approximately 0.

18. The method as claimed in claim 16, wherein, step b) of the parameter computing process includes calculating a plurality of partial differential values as the correcting parameters for updating the set of initial values of the equivalent circuit parameters,
   each of the partial differential values being related to a corresponding one of the equivalent circuit parameters, and a corresponding one of a cumulative resistance error function and a cumulative reactance error function,
   the cumulative resistance error being calculated based upon the cumulative resistance error function, and the cumulative reactance error being calculated based upon the cumulative reactance error function.

19. The method as claimed in claim 16, wherein the parameter computing process includes:
   acquiring voltage, current and rotor speed signals of the induction machine at different time points of an activation stage of the induction machine; and
   obtaining the primary side resistances, the primary side reactances, and the slip rates of the induction machine for the respective time points of the activation stage of the induction machine according to the voltage, current and rotor speed signals, and defining the relationship between the slip rates and the primary side resistances and the relationship between the slip rates and the primary side reactances.

20. The method as claimed in claim 19, further comprising generating a set of output torques of the induction machine according to the estimated circuit parameters and the voltage and rotor speed signals.

* * * * *